United States Patent
Terry et al.

(10) Patent No.: US 9,588,902 B2
(45) Date of Patent: Mar. 7, 2017

(54) FLEXIBLE PAGE SIZES FOR VIRTUAL MEMORY

(71) Applicants: Advanced Micro Devices, Inc., Sunnyvale, CA (US); ATI Technologies ULC, Markham (CA)

(72) Inventors: Elene Terry, Sunnyvale, CA (US); Dhirendra Partap Singh Rana, Richmond Hill (CA)

(73) Assignees: Advanced Micro Devices, Inc., Sunnyvale, CA (US); ATI Technologies, ULC, Markham, Ontario (CA)

( * ) Notice: Subject to any disclaimer, the term of this patent is extended or adjusted under 35 U.S.C. 154(b) by 742 days.

(21) Appl. No.: 13/693,146

(22) Filed: Dec. 4, 2012

(65) Prior Publication Data
US 2014/0156968 A1    Jun. 5, 2014

(51) Int. Cl.
*G06F 12/10* (2016.01)

(52) U.S. Cl.
CPC .... *G06F 12/1009* (2013.01); *G06F 2212/652* (2013.01)

(58) Field of Classification Search
CPC ............... G06F 12/02; G06F 9/45558; G06F 17/30156; G06F 12/10; G06F 12/12; G06F 19/3468; G06F 21/00; G06F 11/1076; G06F 11/3034; G06F 2212/654; G06F 12/109; G06F 11/0712; G06F 2009/45583; G06F 2212/652; G06F 2212/7201
See application file for complete search history.

(56) References Cited

U.S. PATENT DOCUMENTS

| 4,410,941 | A  | * | 10/1983 | Barrow et al. | 711/207 |
|---|---|---|---|---|---|
| 5,794,228 | A  | * | 8/1998 | French et al. | |
| 5,835,963 | A  | * | 11/1998 | Yoshioka et al. | 711/207 |
| 6,079,004 | A  | * | 6/2000 | Liedtke | 711/207 |
| 6,189,074 | B1 | * | 2/2001 | Pedneau | 711/139 |
| 6,643,759 | B2 | * | 11/2003 | Andersson et al. | 711/207 |
| 6,671,791 | B1 | * | 12/2003 | McGrath | 711/206 |
| 6,823,433 | B1 | * | 11/2004 | Barnes et al. | 711/163 |
| 8,041,923 | B2 | * | 10/2011 | Greiner et al. | 711/206 |

(Continued)

OTHER PUBLICATIONS (Intel® 64 and IA-32 Architectures Software Developer's Manual vol. 3A: System Programming Guide, Part 1, May 2011).*

*Primary Examiner* — Adam M Queler
*Assistant Examiner* — Alex Olson
(74) *Attorney, Agent, or Firm* — Volpe and Koenig, P.C.

(57) ABSTRACT

A method for translating a virtual memory address into a physical memory address includes parsing the virtual memory address into a page directory entry offset, a page table entry offset, and an access offset. The page directory entry offset is combined with a virtual memory base address to locate a page directory entry in a page directory block, wherein the page directory entry includes a native page table size field and a page table block base address. The page table entry offset and the page table block base address are combined to locate a page table entry, wherein the page table entry includes a physical memory page base address and a size of the physical memory page is indicated by the native page table size field. The access offset and the physical memory page base address are combined to determine the physical memory address.

10 Claims, 6 Drawing Sheets

(56) References Cited

U.S. PATENT DOCUMENTS

| | | | |
|---|---|---|---|
| 2005/0086650 A1* | 4/2005 | Yates et al. | 717/139 |
| 2006/0004983 A1* | 1/2006 | Tsao et al. | 711/202 |
| 2006/0149919 A1* | 7/2006 | Arizpe | G06F 12/1009 711/206 |
| 2009/0077306 A1* | 3/2009 | Arcedera et al. | 711/103 |
| 2009/0172344 A1* | 7/2009 | Grochowski et al. | 711/207 |
| 2010/0235831 A1* | 9/2010 | Dittmer | 718/1 |
| 2011/0029961 A1* | 2/2011 | Muth et al. | 717/154 |
| 2011/0071813 A1* | 3/2011 | Bohizic et al. | 703/26 |
| 2011/0087858 A1* | 4/2011 | Persson et al. | 711/206 |
| 2013/0246709 A1* | 9/2013 | Segelken et al. | 711/125 |
| 2014/0019689 A1* | 1/2014 | Cain et al. | 711/136 |

\* cited by examiner

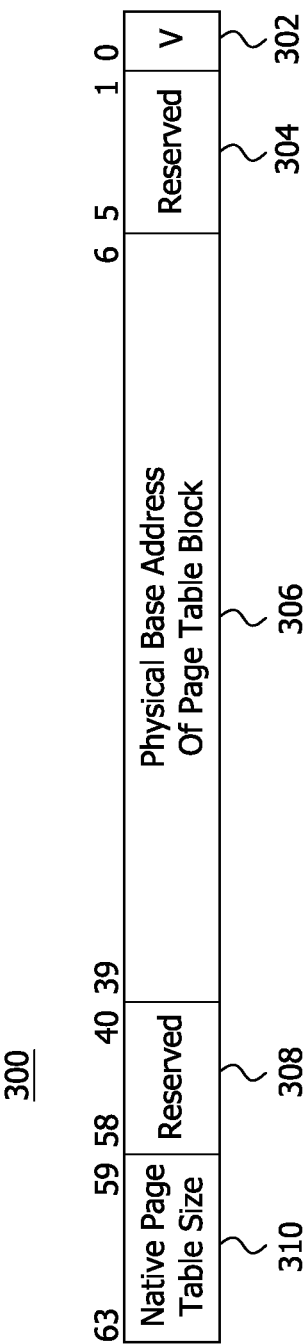
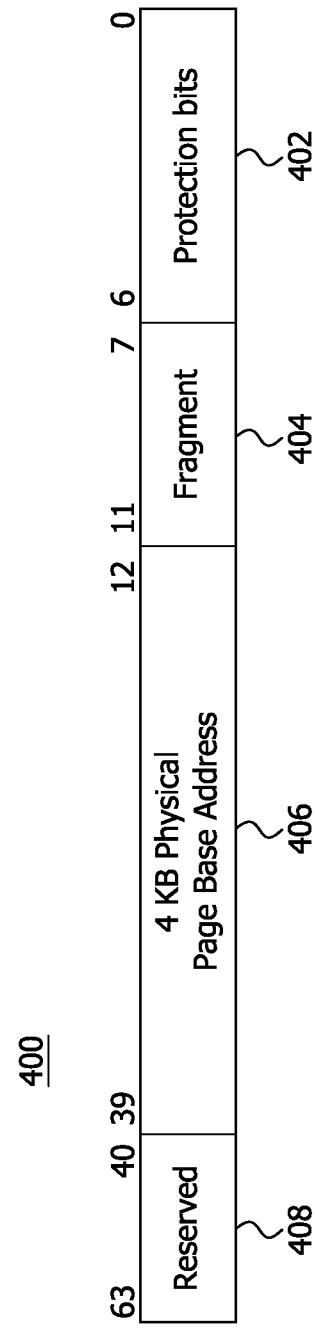

FLEXIBLE PAGE SIZES FOR VIRTUAL MEMORY

FIELD OF THE INVENTION

The present invention is generally directed to virtual memory, and in particular, to providing flexible page sizes for virtual memory.

BACKGROUND

Virtual memory may be used when the physical memory of a computer system is not large enough to hold all of the desired content. A virtual memory address is used to access the physical memory location where the content is stored. The physical memory location may be identified by a physical memory page (by specifying a base address of the physical memory page) and an offset within the physical memory page. The relationship between the virtual memory address and the corresponding physical memory address is stored in a page table.

The virtual memory page-translation mechanism enables system software to create separate address spaces for each process or application. These address spaces are known as virtual address spaces. The system software uses the paging mechanism to selectively map individual pages of physical memory into the virtual address space using a set of hierarchical address-translation tables known collectively as page tables. Virtual memory may be implemented with any processor, including, but not limited to, a central processing unit (CPU), a graphics processing unit (GPU), and an accelerated processing unit (APU).

The page table footprint (size of the page table) to map a large memory space can become significant in size. One exemplary system contains 4 KB, 64 KB, and potentially larger page sizes. With the current page table format, a page table footprint is created that assumes that all page sizes are 4 KB. For example, a non-sparse 16 GB memory mapped using 4 KB pages requires 32 MB of space to store the page table. But if all the pages were 64 KB pages and if 64 KB page table entries (PTEs) could be stored natively in the page table, the page table size could be reduced to 8 MB.

Because the virtual memory space is larger than the physical memory of a system, some of the virtual memory might not be mapped (referred to discontiguous regions of mapped memory). Using a multiple-layer page table allows a smaller page table footprint by not mapping some areas of the virtual memory. In one example implementation, the x86 (CPU) processor page table format allows only three sizes of page tables: 4 KB, 2 MB, and 1 GB. To support the 2 MB and 1 GB formats, there is a bit indicating that the next level is not a page table block, but rather another PTE. In contrast, a flat page table means that the entire virtual memory address range would need to be mapped.

The table may be cached, for example, in a translation look-aside buffer (TLB). For caching, it is better to use larger pages. One example GPU virtual memory scheme uses fragments (which may be larger or smaller than a full page in size), which addresses the caching problem (by using larger page sizes), but not the page table footprint problem.

SUMMARY OF EXEMPLARY EMBODIMENTS

A method for translating a virtual memory address into a physical memory address includes parsing the virtual memory address into a page directory entry offset, a page table entry offset, and an access offset. The page directory entry offset is combined with a virtual memory base address to locate a page directory entry in a page directory block, wherein the page directory entry includes a native page table size field and a page table block base address. The page table entry offset and the page table block base address are combined to locate a page table entry, wherein the page table entry includes a physical memory page base address and a size of the physical memory page is indicated by the native page table size field. The access offset and the physical memory page base address are combined to determine the physical memory address.

A processor configured to translate a virtual memory address into a physical memory address includes circuitry configured to parse the virtual memory address into a page directory entry offset, a page table entry offset, and an access offset. The processor further includes circuitry configured to: combine the page directory entry offset with a virtual memory base address to locate a page directory entry in a page directory block, wherein the page directory entry includes a native page table size field and a base address of a page table block; combine the page table entry offset and the base address of the page table block to locate a page table entry, wherein the page table entry includes a base address of a physical memory page and a size of the physical memory page is indicated by the native page table size field; and combine the access offset and the base address of the physical memory page to determine the physical memory address.

A non-transitory computer-readable storage medium storing a set of instructions for execution by a general purpose computer to translate a virtual memory address into a physical memory address, the set of instructions including a parsing code segment and three combining code segments. The parsing code segment parses the virtual memory address into a page directory entry offset, a page table entry offset, and an access offset. The first combining code segment combines the page directory entry offset with a virtual memory base address to locate a page directory entry in a page directory block, wherein the page directory entry includes a native page table size field and a base address of a page table block. The second combining code segment combines the page table entry offset and the base address of the page table block to locate a page table entry, wherein the page table entry includes a base address of a physical memory page and a size of the physical memory page is indicated by the native page table size field. The third combining code segment combines the access offset and the base address of the physical memory page to determine the physical memory address.

A method for determining a number of page table entries needed to address a given virtual address space includes determining a page size of each page table entry pointed to by a page directory entry; determining a page directory entry address space pointed to; and determining the number of page table entries by dividing the page directory entry address space pointed to by the page size of each page table entry.

A page directory entry for use in translating a virtual memory address into a physical memory address includes a native page table size field, indicating a size of a corresponding physical memory page; and a base address of the physical memory page.

BRIEF DESCRIPTION OF THE DRAWINGS

A more detailed understanding may be had from the following description, given by way of example in conjunction with the accompanying drawings, wherein:

FIG. 3 is a diagram of a page directory entry (PDE) format;

FIG. 4 is a diagram of a page table entry (PTE) format;

DETAILED DESCRIPTION

To optimize the footprint of the page table, it would be beneficial to store each page in its native page size. Storing PTEs in their native sizes allows for hardware prefetch optimizations to read in multiple adjacent pages, which increases performance.

Figure 1:
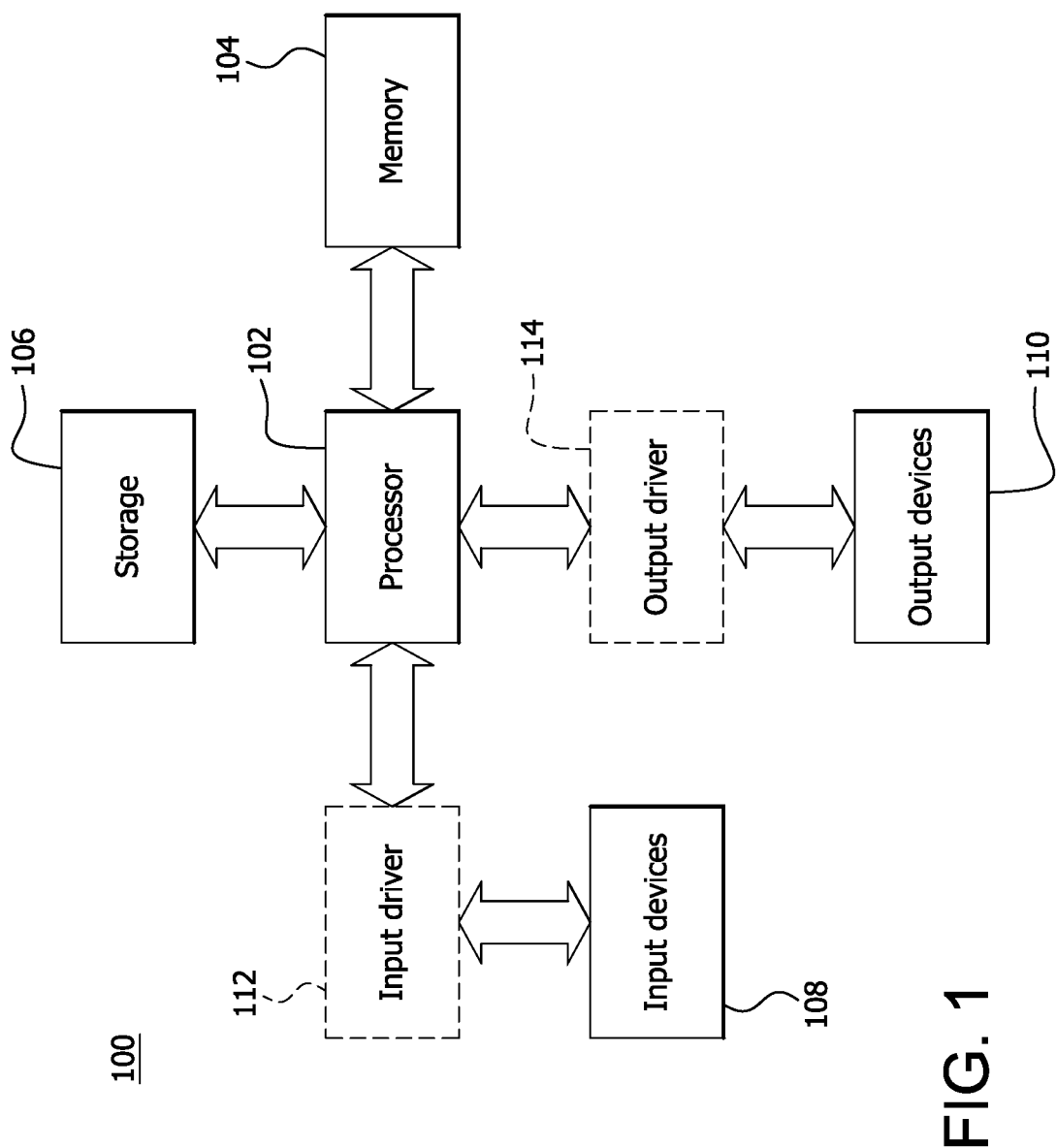
FIG. 1 is a block diagram of an example device in which one or more disclosed embodiments may be implemented.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

The phrase "walking the page table" refers to the process of finding a physical address from a virtual address. The virtual address includes a page directory entry (PDE) offset, a page table entry (PTE) offset, and an access offset. The PDE offset is an offset into a page directory block (PDB), which is used to locate the PDE. The PDE contains the base address of a page table block (PTB). The PTE offset is an offset into the PTB, and combined with the base address of the PTB, is used to locate the PTE. The PTE contains the base address of the physical memory page. The access offset is the offset within the physical memory page, and combined with the base address of the physical memory page, gives the physical address.

Figure 2:
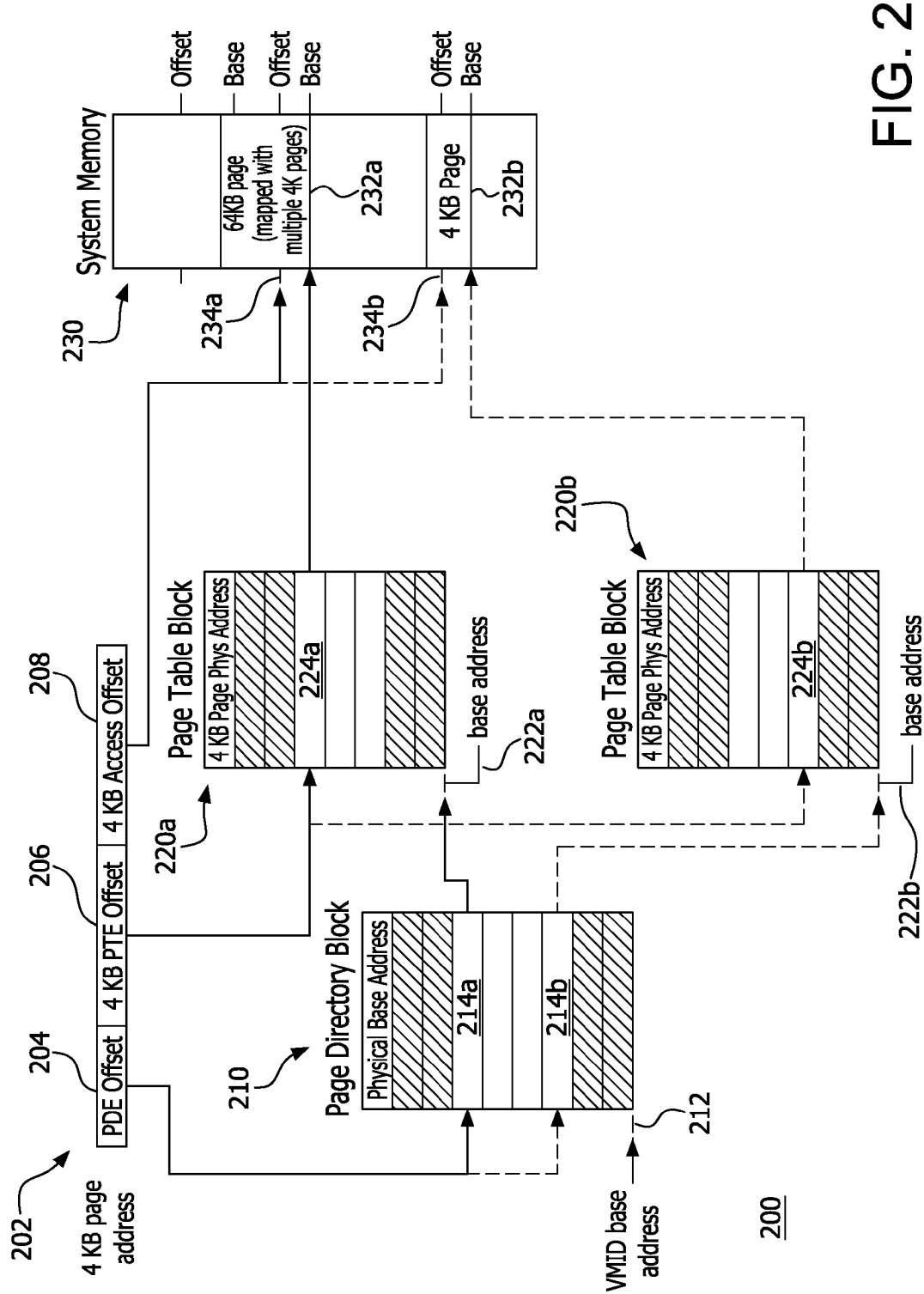
FIG. 2 is a diagram of an example of determining a physical memory address from a virtual memory address.

FIG. 2 is a diagram of an example 200 of determining a physical memory address from a virtual memory address. The virtual memory address 202 includes a PDE offset 204, a 4 KB PTE offset 206, and a 4 KB access offset 208. It is noted that the example 200 shows two different examples of walking the page table; one example uses solid lines and the letter "a" after the corresponding reference number and the other example uses dashed lines and the letter "b" after the corresponding reference number.

A PDB 210 contains all of the PDEs. A virtual memory identifier (VMID) base address 212 of the PDB 210 is already known to the system. The PDE offset 204 combined with the base address 212 of the PDB 210 is used to locate the PDE 214. The PDE 214 contains a base address 222 of a PTB 220. The PTE offset 206 from the virtual address 202 is combined with the base address 222 of the PTB 220 to find the PTE 224. The PTE 224 contains a base address 232 of a physical memory page in a system memory 230 where the information is located. The access offset 208 from the virtual address 202 is combined with the base address 232 of the physical memory page to find a memory location 234 where the information is located.

Using flexible page sizes for virtual memory allows the page table footprint to be reduced. The page table is constructed so that only one entry is required for each page of mapping. The flexible PDE format described below includes a field indicating the native size of the PTEs contained in the PTB. Different PTBs can contain pages of different native sizes. For example, one PTB can point to 4 KB physical memory pages, and a separate PTB can point to 2 MB physical memory pages. This PDE format does not change the page table walking mechanism, but only changes the math of calculating the addresses. This format is easy to implement and is flexible in the way the pages are set up.

Storing the pages in their native sizes allows the hardware to read in multiple adjacent PTEs with a single memory read and have those PTEs point to different areas of memory. Currently, if there is a large fragment, adjacent PTEs are identical and most of the data in the memory read used to walk the page tables is discarded.

Each PDE stores a pointer to the physical base address of a PTB where the PTEs can be found, and describes the native page size of the PTEs in the PTB. Every PTB maps a constant size of memory that is set once (at boot time), and is referred to as the Native Page Table Size. Programming the PTB to point to a larger memory size allows native PTE sizes to be larger than 2 MB and also reduces the number of PDEs necessary to map the memory.

In a GPU implementation, there is a single PDB per running application. The base address of each PDB is defined by a 4-bit VMID field, and up to 16 PDBs can be defined per virtual memory layer. Bits 39:21 of each 64-bit virtual memory address specify the location of a PDE in a PDB block. Therefore, each PDB could have up to $2^{19}$ (512K) 64-bit PDE entries, although the normal case would to be have far fewer PDEs in each block.

FIG. 3 is a diagram of one implementation of a PDE format 300. The PDE 300 includes a valid bit (V) field 302, a first group of reserved bits 304, a physical base address of PTB field 306, a second group of reserved bits 308, and a Native Page Table Size field 310. It is noted that the PDE format 300 is an example of one possible implementation of the PDE format, and that a person skilled in the art could vary the number of bits used to convey similar information.

The valid bit field 302 is used to indicate whether the PDE is valid. For example, if V=1, then PDE is valid, and if V=0, then the PDE is not valid. The physical base address of PTB field 306 points to the physical base address of a PTB (the V bit 302 is ignored for addressing and is considered to be 0). Bits 5:0 are all considered as zeros for the addressing, thus the address granularity is 64 bytes. Because each PTE is 64 bits wide (8 bytes), this field can point to every eighth PTE.

The physical base address of PTB field 306 is large enough (in one implementation, this field uses bits 39:6) to address page sizes larger than 4 KB, so the address space does not need to be 4 KB-aligned, like in x86-type systems. This permits multiple PTBs on a single page, such that multiple PTEs could point to different parts of the same page. This means that a page can be suballocated, and each PTB does not have to be 4 KB-aligned (like in an x86-type system). Without the 4 KB-aligned PTB, any size page can be accessed by using only a two-level page walking mechanism.

x86-type virtual memory systems use one bit to indicate whether the address is to another PTB or to the physical memory page itself, which may result in needing more than two levels of page walking to address certain page sizes. For example, because of the 4 KB alignment requirement, multiple levels are needed to address the 2 MB and 1 GB page sizes. By specifying the physical memory page size in the PDE, fewer PTEs are needed in the PTB, because each PTE points to a larger physical memory page.

For the Native Page Table Size field 310, 2 raised to the power of this field multiplied by 4 KB indicates the native address space for each of the component PTEs in the PTB pointed to by the PDE. For example, if the PDE Native Page Table Size=9, then the native address space, or page size, pointed to by a PTE is:

$$\text{PTE adress space}=2^{NativePageTableSize}\times 4\text{ KB}=2^9\times 4\text{ KB}=512\times 4\text{ KB}=2\text{ MB}$$

If the Native Page Table Size=4, then the page size represented by a PTE would be 64 KB. If the Native Page Table Size=0, then the page size=4 KB (the legacy case).

The PTB contains 512 64-bit PTEs and occupies a 4 KB memory footprint. In the legacy case, a PTE points to a 4 KB memory page, such that all 512 PTEs in the PTB are needed to address a 2 MB memory space (512×4 KB=2 MB). With the flexible page size, this changes. For example, if the PDE Native Page Table Size field=4, each PTE points to a 64 KB page, such that only 32 PTEs of the 512 PTEs in the PTB are now required to address a 2 MB memory space (32×64 KB=2 MB). In this case, the 4 KB PTB can be shared by up to 16 different PDEs. If the PDE Native Page Table Size=9, each PTE points to a 2 MB memory space such that only one PTE of the 512 PTEs in the PTB is required to address a 2 MB memory space. In this case, the 4 KB PTB can be shared by up to 512 different PDEs. The result is that the memory footprint of the PTB can be reduced by specifying larger pages using the PDE Native Page Table Size field.

FIG. 4 is a diagram of one implementation of a PTE format 400. The PTE 400 includes a group of protection bits 402 used to control access to the PTE, a fragment field 404, a 4 KB physical page base address field 406, and a group of reserved bits 408. It is noted that the PTE format 400 is an example of one possible implementation of the PTE format, and that a person skilled in the art could vary the number of bits used to convey similar information.

The fragment field 404 is a 4-bit field that supplies a directive to the page table unit about the size of the fragment in which the designated page lies. It is a power of 2, such that a value of 0 indicates a fragment size of one page or 4 KB, a value of 1 corresponds to a two page or 8 KB fragment, a value of 2 means a four page or 16 KB fragment, and so on. It is noted that the PTE fragment field value 404 must be larger than the PDE Native Page Table Size field 310. The PTE fragment size is not based on or relative to the PDE Native Page Table Size; it is treated as an absolute fragment size. The PDE Native Page Table Size represents the physical footprint of each PTE pointed to by that PDE, while the PTE fragment size represents the maximum logical address space shared by a collective of similar contiguous PTEs. In general, the following formula shows how the fragment field 404 relates to the size of the fragment:

$$\text{Logical/Physical fragment size in bytes}=2^{(12+fragment)}$$

The 4 KB physical page base address field 406 is the physical base address of the memory page. The PTE format does not change, regardless of the page size. The 4 KB physical page base address field 406 has enough bits to address page sizes larger than 4 KB. The smallest page size supported is 4 KB. In one implementation, with 18 bits, this field can address $2^{18}\times 4$ KB=1 TB of memory. This field is affected by the PDE Native Page Table Size field. For example, if the Native Page Table Size is 9, then the granularity of this field is 2 MB instead of 4 KB.

Figure 5:
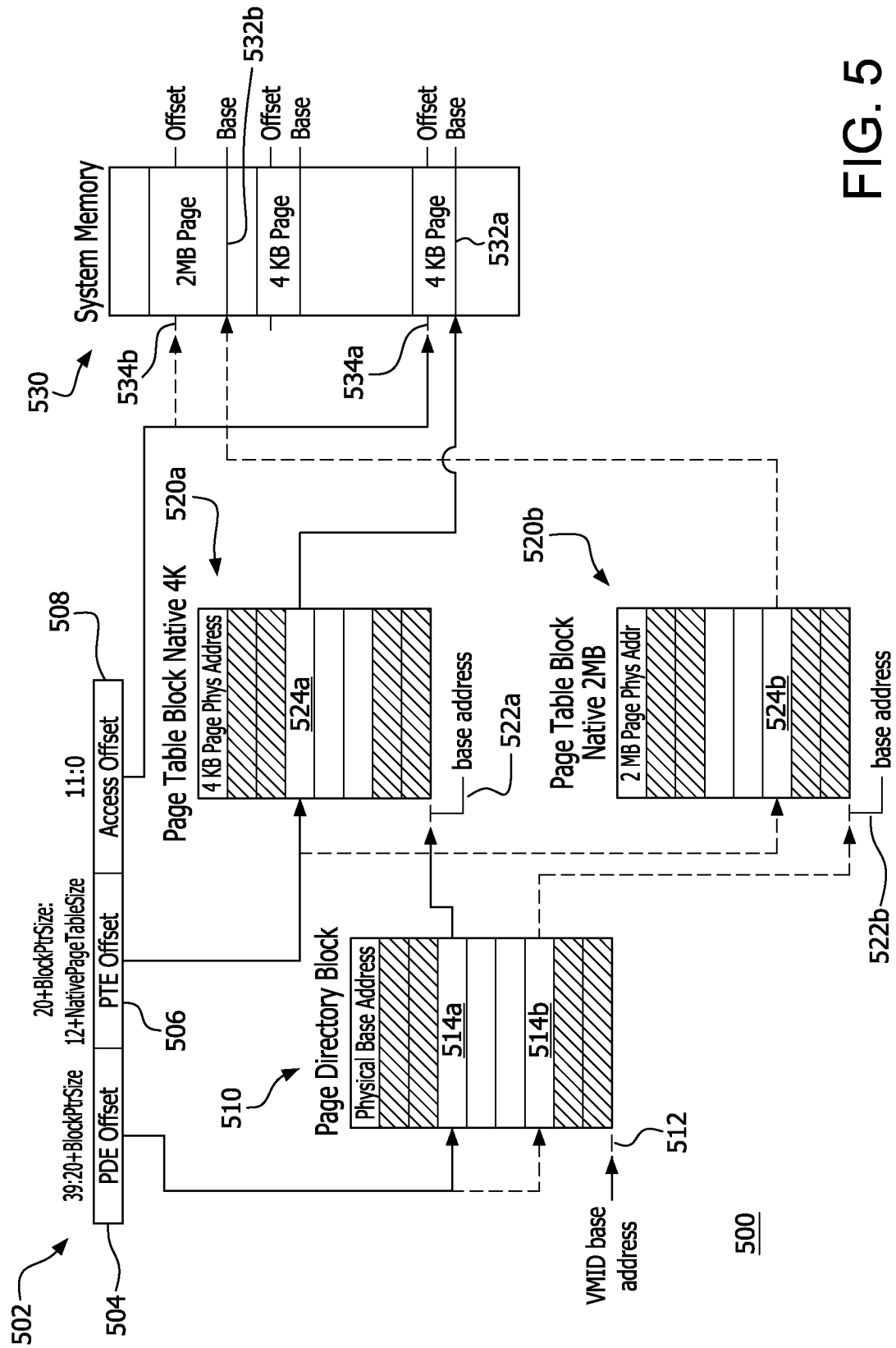
FIG. 5 is a diagram of an example of determining a physical memory address from a virtual memory address with flexible PTE sizes.

FIG. 5 is a diagram of an example 500 of determining a physical memory address from a virtual memory address with flexible PTE sizes. The virtual memory address 502 includes a PDE offset 504, a PTE offset 506, and an access offset 508. It is noted that the example 500 shows two different examples of walking the page table; one example uses solid lines and the letter "a" after the corresponding reference number and the other example uses dashed lines and the letter "b" after the corresponding reference number. A PDB 510 contains all of the PDEs. A VMID base address 512 of the PDB 510 is already known to the system. The PDE offset 504 combined with the base address 512 of the PDB 510 is used to locate the PDE 514. The PDE 514 contains a base address 522 of a PTB 520. The PTE offset 506 from the virtual address 502 is combined with the base address 522 of the PTB 520 to find the PTE 524. The PTE 524 contains a base address 532 of a physical memory page in a system memory 530 where the information is located. The access offset 508 from the virtual address 502 is combined with the base address 532 of the physical memory page to find a memory location 534 where the information is located.

It is noted that the page table walking mechanism is the same in both FIGS. 2 and 5, even though the physical memory pages pointed to have different sizes.

Figure 6:
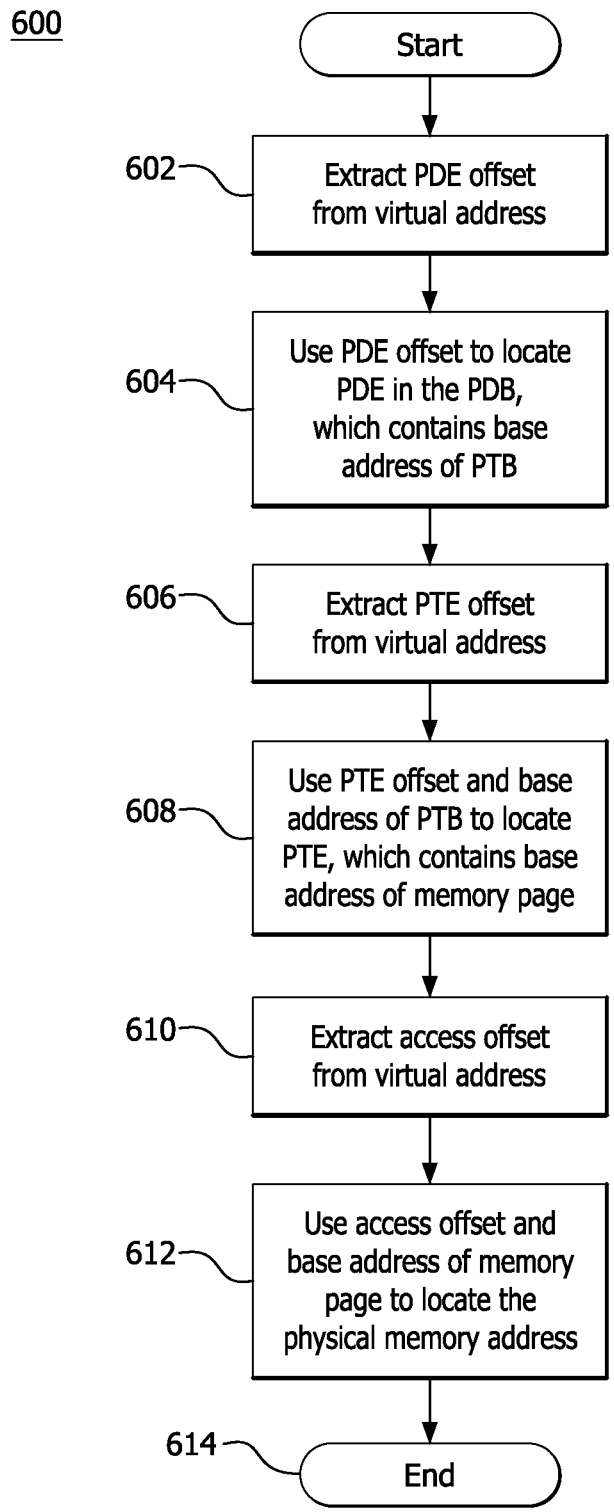
FIG. 6 is a flowchart of a method for converting a virtual memory address to a physical memory address.

FIG. 6 is a flowchart of a method 600 for converting a virtual memory address to a physical memory address. The PDE offset is extracted from the virtual address (step 602). The PDE offset is used to locate a PDE in the PDB, which contains the base address of the PTB (step 604). The PTE offset is extracted from the virtual address (step 606). The PTE offset and the base address of the PTB are used to locate the PTE, which contains the base address of the physical memory page (step 608). The access offset is extracted from the virtual address (step 610). The access offset and the base address of the physical memory page are used to locate the physical address (step 612) and the method terminates (step 614).

The PAGE_TABLE_BLOCK_SIZE register field is located in a separate configuration register and is used to determine how much address space is represented by a PDE. The PDE address space divided by the PTE page size for that PDE determines how many PTEs are required to represent all of the PDE address space.

The legacy meaning of the PAGE_TABLE_BLOCK_SIZE register field is that it indicates $\log_2$(number of 4 KB pages in a PTB). With the flexible page table size, the amount of address space pointed to by the PDE is $\log_2$ (PDE_ADDRESS_SPACE/2 MB). This PDE address space is in power-of-two multiples of 2 MB (PDE_ADDRESS_SPACE=(2 MB$\times 2^{PAGE\_TABLE\_BLOCK\_SIZE}$)). The PTB is no longer a minimum 4 KB page worth of PTEs (at 8 bytes per PTE, that would have been a minimum of 512 PTEs). Instead, it is the number of PTEs with a given footprint indicated by the value of the PDE Native Page Table Size field required to represent the PDE address space indicated with the PAGE_TABLE_BLOCK_SIZE field.

The PAGE_TABLE_BLOCK_SIZE and PDE Native Page Table Size are independent, but they work together to define the number of PTEs necessary to represent the address space pointed to by the PDE:

$$\text{Number of PTEs} = (2 \text{ MB} \times 2^{PAGE\_TABLE\_BLOCK\_SIZE}) / (4 \text{ KB} \times 2^{PDE\ Native\ Page\ Table\ Size}).$$

Figure 7:
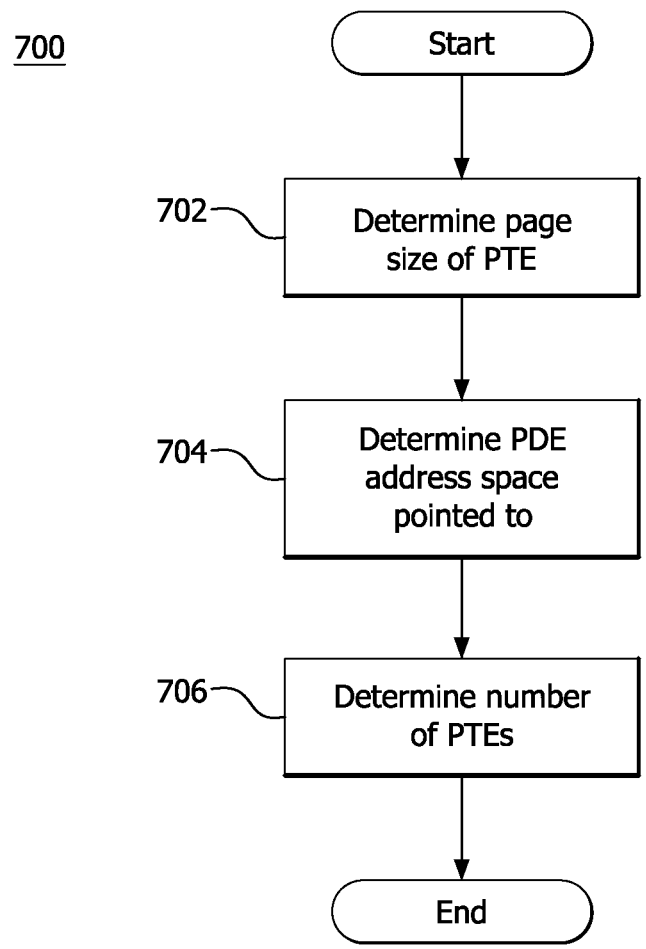
FIG. 7 is a flowchart of a method for determining a number of PTEs needed for a given address space.

Because of the PDE address pointer alignment restriction, a minimum of eight PTEs must be in a page table block; however, all but the first may be unused. FIG. 7 is a flowchart of an example process 700 of how to determine the number of PTEs needed for a given address space.

First, determine the page size of each PTE pointed to by a PDE (step 702). For example, if the PDE Native Page Table Size=9, then the native address space, or page size, pointed to by a PTE is:

$$\text{PTE address space} = 2^{Native\ Page\ Table\ Size} \times 4 \text{ KB} = 2^9 \times 4 \text{ KB} = 512 \times 4 \text{ KB} = 2 \text{ MB}$$

Next, determine the PDE address space pointed to (step 704). Multiply the PTE page size by $2^{PAGE\_TABLE\_BLOCK\_SIZE}$, as follows (for this example of a 2 MB page size):

PDE address space pointed to=2 MB$\times 2^{PAGE\_TABLE\_BLOCK\_SIZE}$

For example, if the PAGE_TABLE_BLOCK_SIZE is 3: PDE address space pointed to=2 MB$\times 2^3$=16 MB.

Then determine the number of PTEs=(2 MB$\times 2^{PAGE\_TABLE\_BLOCK\_SIZE}$)/(4 KB$\times 2^{Native\ Page\ Table\ Size}$)=16 MB/2 MB=8 (step 706).

The result is that eight PTEs are required to represent the 16 MB address space. As previously mentioned, the granularity with which a PDE can address a physical PTE location is 64 bytes, so a PDE can only point to every eighth PTE. In this case, all eight PTEs are used to represent the 16 MB address space.

If, for example, the PAGE_TABLE_BLOCK_SIZE field=0, then the total address space represented by a PDE is 2 MB. If the PDE Native Page Table Size=9, each PTE still points to a 2 MB page, so only one PTE is needed to represent the 2 MB address space. Because the next PTE base address that the PDE can point to is 64 bytes away, the intervening seven PTEs cannot be used for anything and are thus wasted. If the number of PTEs required to fill the memory space represented by a PDE is less than eight, there will be reduced memory storage efficiency.

It should be understood that the methods described herein may be implemented in a CPU, a GPU, an APU, or any other processor that uses virtual memory and that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for translating a virtual memory address into a physical memory address, comprising:
    parsing the virtual memory address into a page directory entry offset, a page table entry offset, and an access offset;
    combining the page directory entry offset with a virtual memory base address to locate a page directory entry in a page directory block, wherein the page directory entry includes a native page table size field and a base address of a page table block, wherein the native page table size field indicates a size of a corresponding physical memory page;
    combining the page table entry offset and the base address of the page table block to locate a page table entry, wherein the page table entry includes a base address of a physical memory page and a fragment field, wherein the size of the physical memory page is indicated by the native page table size field and a size of the fragment field is larger than the native page table size field; and
    combining the access offset and the base address of the physical memory page based on the fragment field to determine the physical memory address.

2. The method according to claim 1, wherein the native page table size enables a requested physical memory page to be accessed without requiring additional address translation, when a size of the requested physical memory page is greater than a size of the physical memory and less than a size of the virtual memory.

3. The method according to claim 1, wherein the native page table size is used to indicate a native address space pointed to by the page table entry, based on the formula: address space=(2^ native page table size)×4 KB.

4. The method according to claim 1, wherein a memory footprint of the page table block may be reduced when the native page table size is greater than or equal to one.

5. A processor configured to translate a virtual memory address into a physical memory address, comprising:
   circuitry configured to parse the virtual memory address into a page directory entry offset, a page table entry offset, and an access offset; and
   circuitry configured to:
      combine the page directory entry offset with a virtual memory base address to locate a page directory entry in a page directory block, wherein the page directory entry includes a native page table size field and a base address of a page table block, wherein the native page table size field indicates a size of a corresponding physical memory page;
      combine the page table entry offset and the base address of the page table block to locate a page table entry, wherein the page table entry includes a base address of a physical memory page and a fragment field, wherein the size of the physical memory page is indicated by the native page table size field and a size of the fragment field is larger than the native page table size field; and
      combine the access offset and the base address of the physical memory page based on the fragment field to determine the physical memory address.

6. A non-transitory computer-readable storage medium storing a set of instructions for execution by a general purpose computer to translate a virtual memory address into a physical memory address, the set of instructions comprising:
   a parsing code segment for parsing the virtual memory address into a page directory entry offset, a page table entry offset, and an access offset;
   a first combining code segment for combining the page directory entry offset with a virtual memory base address to locate a page directory entry in a page directory block, wherein the page directory entry includes a native page table size field, a fragment field and a base address of a page table block, wherein the native page table size field indicates a size of a corresponding physical memory page and a size of the fragment field is larger than the native page table size field;
   a second combining code segment for combining the page table entry offset and the base address of the page table block to locate a second page table entry based on the fragment field, wherein the second page table entry includes a second base address of a second physical memory page and a second fragment field, wherein the size of the second physical memory page is indicated by the native page table size field; and
   a third combining code segment for combining the access offset and the second base address of the second physical memory page to determine the physical memory address.

7. The non-transitory computer-readable storage medium of claim 6, wherein the instructions are hardware description language (HDL) instructions.

8. A method for determining a number of page table entries needed to address a given virtual address space, comprising:
   determining a page size of each page table entry pointed to by a page directory entry based upon a page directory entry native page table size;
   determining a page directory entry address space pointed to; and
   determining the number of page table entries by dividing the page directory entry address space pointed to by the page size of each page table entry, wherein each of the page table entries includes a base address of a physical memory page and a fragment field, wherein the size of the physical memory page is indicated by a native page table size field of the page directory entry and a size of the fragment field is larger than the native page table size field.

9. The method according to claim 8, wherein the page size of each page table entry is determined by the formula: page size=(2^ native page table size)×4 KB.

10. The method according to claim 8, wherein the page directory address space pointed to is determined by the formula: page size of page size entry×(2^ page table block size), wherein the page table block size is a predetermined value.

* * * * *